United States Patent [19]

Schwarz et al.

[11] 3,821,202

[45] June 28, 1974

[54] PROCESS FOR PURIFYING LACTAMS

[75] Inventors: Hans Helmut Schwarz, Krefeld; Otto Immel; Hermann Schnell, both of Krefeld-Uerdingen, all of Germany

[73] Assignee: Bayer Aktiengesellschaft, Leverkusen, Germany

[22] Filed: May 4, 1973

[21] Appl. No.: 357,360

Related U.S. Application Data

[63] Continuation-in-part of Ser. No. 126,346, March 19, 1971, abandoned.

[52] U.S. Cl. .................... 260/239.3 A, 260/560 A
[51] Int. Cl. ............................................. C07d 53/06
[58] Field of Search ................ 260/239.3 A, 566 A

[56] References Cited
UNITED STATES PATENTS 2,716,114   8/1955   Blaser et al. ................. 260/239.3 A
3,248,388   4/1966   Wintersberger et al. ..... 260/239.3 A
3,356,675   12/1967  Muench et al. .............. 260/239.3 A

*Primary Examiner*—John D. Randolph
*Assistant Examiner*—Robert J. Bond
*Attorney, Agent, or Firm*—Plumly and Tyner

[57]   ABSTRACT

This invention relates to a process for the removal of oximes from lactams which comprises treating an oxime-containing lactam obtained by the catalytic rearrangement of an oxime in the gaseous phase with sulphur dioxide at a temperature of from 70° to 170°C. and up to a concentration of at least 1 mol of sulphur dioxide based on 1 mol of the oxime removing on completion of the reaction the excess sulphur dioxide and recovering the lactam by distillation.

2 Claims, No Drawings

PROCESS FOR PURIFYING LACTAMS

This invention is a continuation-in-part of United States Patent Application Serial No. 126,346 filed March 19, 1971, now abandoned.

This invention relates to a process for the purification of oxime-containing lactams by introducing sulphur dioxide at a temperature of from 70° to 170°C.

There are a number of synthesis techniques for producing caprolactam. Hitherto, caprolactam has been commercially obtained primarily through the Beckmann rearrangement of cyclohexanone oxime in sulphuric acid. The catalytic rearrangement of oximes in the gaseous phase has recently been acquiring increasing interest because no ammonium sulphate is formed as a secondary product in this process.

In the catalytic rearrangement of oximes in the gaseous phase, it is frequently impossible as the activity of the catalyst weakens to prevent unreacted oxime from leaving the reactor and being deposited in the condenser together with the caprolactam formed. Separation of the oxime from the lactam is either totally impossible or far too expensive to carry out with the aid of physical separation techniques, especially in cases where the oxime content is less than 1 percent, because the physical properties of both substances are related. On the other hand, however, complete removal of the oxime is absolutely necessary if interruptions during further processes of the lactam are to be avoided. For this reason, it was necessary, to develop a simple process readily carried out on a commercial scale by means of which small quantities of oxime in lactam can be removed.

Hitherto, only one process has been described in the literature. In this process, basic amines are precipitated as salts with $CO_2$ or $SO_2$ from solutions of caprolactam emanating from the dissociation of polyamide waste. Unfortunately, these lactams did not contain any oxime.

It is an object of this invention to avoid the above mentioned disadvantages.

This object is accomplished by a process for the removal of oximes from lactams, which comprises treating an oxime-containing lactam, obtained by the catalytic rearrangement of an oxime in the gaseous phase, with gaseous sulphur dioxide at a temperature of from 70° to 170°C. and up to a concentration of at least 1 mol of sulphur dioxide based on 1 mol of the oxime, removing on completion of the reaction, the excess sulphur dioxide and recovering the lactam by distillation.

The reaction between oximes dissolved in lactams and gaseous sulphur dioxide proceeds at a high velocity with low oxime concentrations providing gaseous $SO_2$ is dissolved in molten lactam at a temperature of from 70 to 170°C. and preferably at a temperature of from 90 to 130°C.

Although the quantity of sulphur dioxide is not critical, it should not be any smaller than 1 mol, based on 1 mol of the oxime. Larger excesses can accelerate the purification of the process to a limited extent.

The reaction times vary from less than 1 minute to 100 minutes, depending upon the concentration of $SO_2$ and oxime. After the reaction has abated, excess $SO_2$ can be removed by vaporizing the mixture in vacuo or by introducing inert gases, after which the caprolactam is distilled, preferably following the addition of alkalis. In this way, an oxime free lactam is obtained.

The following Example is to further illustrate the invention without limiting it.

EXAMPLE

Gaseous $SO_2$ is introduced at 100°C. into caprolactam obtained by the gaseous phase rearrangement of cyclohexanone oxime containing 0.3 percent of cyclohexanone oxime, until the sulphur dioxide concentration amounts to 0.5 percent. After standing for 30 minutes, $SO_2$ and readily volatile substances are removed by applying a vacuum of 5 Torr. 0.3% of NaOH, based on caprolactam, are then added, followed by distillation in vacuo. No cyclohexanone oxime can be detected in the distilled caprolactam.

What is claimed is:

1. A process for the removal of cyclohexanone oxime from the molten caprolactam-containing product, obtained by the catalytic rearrangement of an cyclohexanone oxime in the gaseous phase, which comprises introducing into said lactam at a temperature of from 70° to 170°C. at least 1 mol of gaseous sulphur dioxide based on 1 mol of the cyclohexanone oxime removing the excess sulphur dioxide after a time of about 1 minute to 100 minutes and recovering the lactam by distillation.

2. A process as claimed in claim 1 wherein sodium hydroxide is added before distillation.

* * * * *